United States Patent
Soltau et al.

(10) Patent No.: US 8,276,710 B2
(45) Date of Patent: Oct. 2, 2012

(54) METHOD FOR PRODUCING A LIGHTWEIGHT, SOUND INSULATING COVERING FOR MOTOR VEHICLES AND CORRESPONDING COVERING

(75) Inventors: Dirk Soltau, Düsseldorf (DE); Michael Hansen, Cologne (DE); Thomas Gross, Wermelskirchen (DE); Monika Gruna, Leverkusen (DE)

(73) Assignee: Bayer MaterialScience AG, Leverkusen (DE)

( * ) Notice: Subject to any disclaimer, the term of this patent is extended or adjusted under 35 U.S.C. 154(b) by 951 days.

(21) Appl. No.: 12/224,258

(22) PCT Filed: Feb. 26, 2007

(86) PCT No.: PCT/EP2007/051785
§ 371 (c)(1),
(2), (4) Date: Aug. 22, 2008

(87) PCT Pub. No.: WO2007/096427
PCT Pub. Date: Aug. 30, 2007

(65) Prior Publication Data
US 2012/0080262 A1    Apr. 5, 2012

(30) Foreign Application Priority Data
Feb. 24, 2006 (DE) .......................... 10 2006 009 134

(51) Int. Cl.
*E04B 1/84* (2006.01)
(52) U.S. Cl. ............. 181/294; 181/284; 52/144; 52/145
(58) Field of Classification Search ............ 181/294, 181/284; 52/144, 145
See application file for complete search history.

(56) References Cited

U.S. PATENT DOCUMENTS

| 3,816,233 A * | 6/1974 | Powers ............... 428/213 |
| 3,936,555 A | 2/1976 | Smith, II |
| 4,097,633 A * | 6/1978 | Focht .................. 428/138 |
| 4,101,704 A | 7/1978 | Hiles |
| 4,438,166 A | 3/1984 | Gluck et al. |
| 4,444,704 A | 4/1984 | Hira et al. |

(Continued)

FOREIGN PATENT DOCUMENTS
DE    1 992 873    8/1968
(Continued)

OTHER PUBLICATIONS

German Office Action dated Sep. 30, 2009 with English translation of the relevant portion.

(Continued)

*Primary Examiner* — Forrest M Phillips
(74) *Attorney, Agent, or Firm* — Collard & Roe, P.C.

(57) ABSTRACT

A method for producing a lightweight, sound insulating covering (1, 1', 1'', 1''') for a body component of a motor vehicle, in particular a lightweight dashboard covering, wherein the covering (1, 1', 1'', 1''') is produced as a foamed, sound absorbing molded part in a single-stage operation by injecting a reactive mix, comprising polyol and isocyanate, into a cavity (11) of a foaming tool (9), wherein before and/or during the injecting, at least one predetermined surface portion (17), defining the cavity (11) of the foaming tool (9), is temperature-controlled in such a manner that the foamed molded part comprises an integral substantially pore free skin (1.1) with a thickness of at least 0.5 mm on one side, and comprises an open porous surface (1.2) and/or a thinner, sound permeable skin (1.4) on its side opposite to said skin (1.1).

22 Claims, 4 Drawing Sheets

U.S. PATENT DOCUMENTS

Figure 1:
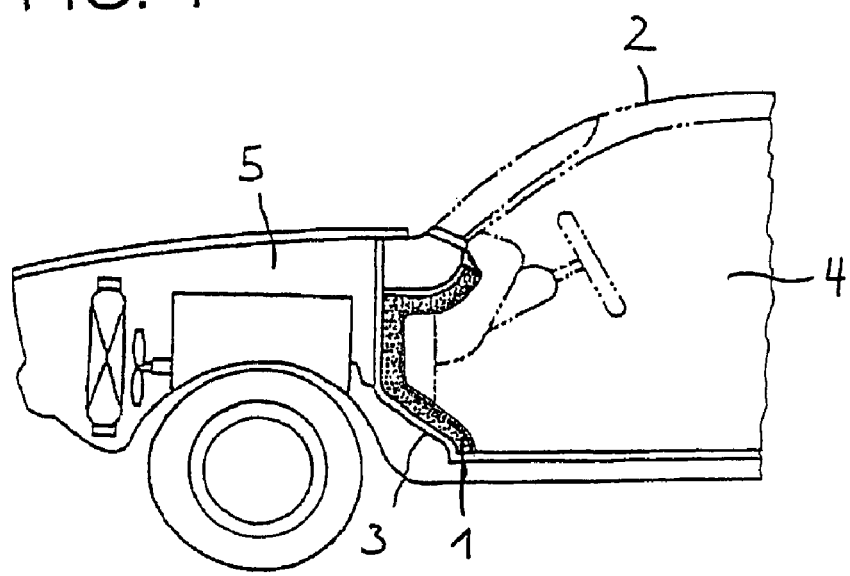

| | | | |
|---|---|---|---|
| 4,476,183 A | | 10/1984 | Holtrop et al. |
| 4,529,639 A | | 7/1985 | Peoples, Jr. et al. |
| 5,064,714 A | | 11/1991 | Yamaguchi et al. |
| 5,094,318 A | | 3/1992 | Maeda et al. |
| 5,174,143 A | * | 12/1992 | Martin .................. 72/53 |
| 5,240,964 A | | 8/1993 | Ohmura et al. |
| 5,518,806 A | | 5/1996 | Eder et al. |
| 5,554,831 A | * | 9/1996 | Matsukawa et al. ......... 181/294 |
| 5,652,415 A | * | 7/1997 | Pelzer et al. ............... 181/286 |
| 5,817,408 A | * | 10/1998 | Orimo et al. ................ 428/218 |
| 5,925,207 A | * | 7/1999 | Itoh et al. ................... 156/216 |
| 5,932,331 A | | 8/1999 | Jones et al. |
| RE37,139 E | * | 4/2001 | Krickl ......................... 428/113 |
| 6,345,688 B1 | * | 2/2002 | Veen et al. .................. 181/290 |
| 6,572,723 B1 | | 6/2003 | Tilton et al. |
| 6,659,223 B2 | | 12/2003 | Allison et al. |
| 6,669,265 B2 | * | 12/2003 | Tilton et al. ................ 296/146.1 |
| 6,695,374 B1 | * | 2/2004 | Gebreselassie et al. ..... 296/24.3 |
| 6,802,389 B2 | | 10/2004 | Tompson et al. |
| 6,846,169 B2 | | 1/2005 | Kobayashi et al. |
| 6,955,845 B1 | * | 10/2005 | Poole et al. .................. 428/76 |
| 7,055,649 B2 | * | 6/2006 | Tompson et al. ............ 181/290 |
| 7,070,848 B2 | * | 7/2006 | Campbell .................... 428/137 |
| 7,080,712 B2 | * | 7/2006 | Tsuiki et al. ................ 181/204 |
| 7,235,206 B2 | | 6/2007 | Kobayashi et al. |
| 7,318,498 B2 | | 1/2008 | Woodman et al. |
| 7,318,499 B2 | * | 1/2008 | Stevenson et al. ........... 181/293 |
| 7,320,739 B2 | | 1/2008 | Thompson, Jr. et al. |
| 7,566,475 B2 | | 7/2009 | Connelly et al. |
| 7,585,559 B2 | | 9/2009 | Schroeder et al. |
| 7,971,683 B2 | | 7/2011 | Bayle et al. |
| 7,980,358 B2 | * | 7/2011 | Soltau et al. ................ 181/286 |
| 2005/0023080 A1 | * | 2/2005 | Tompson et al. ............ 181/296 |
| 2005/0093203 A1 | * | 5/2005 | Kobayashi et al. .......... 264/259 |
| 2005/0183903 A1 | * | 8/2005 | Stevenson et al. ........... 181/293 |
| 2006/0118355 A1 | | 6/2006 | Blömeling et al. |
| 2006/0289231 A1 | | 12/2006 | Priebe et al. |
| 2007/0065644 A1 | * | 3/2007 | Blomeling .................... 428/158 |
| 2007/0287001 A1 | | 12/2007 | Carlson et al. |
| 2008/0067002 A1 | * | 3/2008 | Pfaffelhuber et al. ........ 181/290 |
| 2008/0264555 A1 | * | 10/2008 | Blomeling .................... 156/245 |
| 2009/0127026 A1 | * | 5/2009 | Mandos et al. ............... 181/284 |
| 2010/0038168 A1 | * | 2/2010 | Mandos et al. ............... 181/294 |
| 2010/0108437 A1 | | 5/2010 | Bayle et al. |

FOREIGN PATENT DOCUMENTS

| | | |
|---|---|---|
| DE | 1 779 128 | 8/1970 |
| DE | 2 252 254 | 5/1974 |
| DE | 27 35 153 | 2/1979 |
| DE | 32 02 327 | 8/1982 |
| DE | 37 24 680 | 2/1989 |
| DE | 197 42 198 | 4/1998 |
| DE | 10 2004 054 646 | 6/2006 |
| DE | 10 2005 056 840 | 4/2007 |
| JP | 2001-354746 | 12/2001 |
| JP | 2004-504196 | 2/2004 |
| JP | 2005-350533 | 12/2005 |
| WO | WO 02/09977 | 2/2002 |

OTHER PUBLICATIONS

German Office Action dated Feb. 6, 2007 with translation of relevant portion.

International Search Report.

* cited by examiner

METHOD FOR PRODUCING A LIGHTWEIGHT, SOUND INSULATING COVERING FOR MOTOR VEHICLES AND CORRESPONDING COVERING

CROSS REFERENCE TO RELATED APPLICATIONS

This application is the National Stage of PCT/EP2007/051785 filed on Feb. 26, 2007, which claims priority under 35 U.S.C. §119 of German Application No. 10 2006 009 134.5 filed on Feb. 24, 2006. The international application under PCT article 21(2) was not published in English.

The invention relates to an improved method for producing a lightweight, sound-insulating covering for a body component of a motor vehicle and to a corresponding covering, in particular configured as a dashboard covering to be disposed in a passenger compartment.

Conventional dashboard coverings for motor vehicles are configured from a sound insulating heavy layer and from a foam layer or a textile fleece layer, wherein the foam layer or the fleece layer act as an elastic spring, and the heavy layer acts as an acoustic spring-mass-system. The weight per area of such dashboard coverings is typically in the range above 2 kg/m$^2$.

From DE 27 35 153 A1, a spring-mass-system with low specific weight is known, which is configured as a double mat, which is comprised of soft polyurethane foam with open pores and a of cover layer of filled heavy polyurethane foam, and which is intended in particular as a front wall covering for a motor vehicle. The heavy polyurethane foam is thus configured as integral foam and comprises a shore-hardness A of 80 to 90, and comprises additional filler content of 400% to 500% by weight. In order to achieve said hardness specification of the cover layer, a polyol mix made of commercial hard foam polyol and commercial soft foam polyol is used. The cover layer and the polyurethane soft foam layer are connected amongst one another by back-foaming, wherein the cover layer is inserted into a mold and back-foamed with the soft polyurethane foam. The production of said double mat is relatively time and cost intensive.

It is the object of the present invention to provide a sound insulating and sound absorbing covering, in particular a dashboard covering for motor vehicles, which comprises a low weight and which can be realized at relatively low cost. Simultaneously, a cost effective method for producing such sound insulating covering shall be provided.

With respect to the manufacturing process, this object is accomplished according to the invention by a method with the features of patent claim 1.

The method according to the invention is characterized in that the covering is produced as a foamed sound absorbing molded part in a one step process by injecting a reactive mix comprising polyol and isocyanate into a cavity of a foaming tool, wherein before and/or after the injection at least one predetermined surface portion of the foaming tool defining the cavity is temperature-controlled in such a manner that the foamed molded component comprises an integral, substantially pore-free skin with a thickness of at least 0.5 mm on one side, and an open-pore surface and/or a sound permeable skin on its side opposite to said skin.

The foaming tool is e.g. temperature-controlled such that a temperature difference of at least 15° C., preferably of at least 25° C. exists between its surface portions, where the integral and substantially pore free skin can be generated on the one hand, and where the surface with open pores and/or the thinner sound permeable skin can be generated, on the other hand.

By means of the method according to the invention, lightweight sound-insulating coverings can be produced in a one step process from only one reactive mix, without changing the upper or lower half tool, wherein said coverings insulate and absorb sound. The obtained coverings thus produced substantially reduce the sound level in the passenger compartment and thus improve the driving comfort of the motor vehicle equipped therewith. On the other hand, they increase the weight of motor vehicle only slightly, which is advantageous for a high performance, in particular for the acceleration of said motor vehicle and for low fuel consumption.

Compared to the method known from DE 27 35 153 A1, the number of required material components is reduced in the method according to the invention. The reduction or minimization of the material components used is advantageous with respect to material storage and material cost, since less storage containers and associated equipment are required. When purchasing larger quantities of one or a few material components, typically a better price can be achieved than when purchasing respective volumes, which comprise a larger number of material components.

The production method according to the invention thus requires only relatively low investment, since it does not provide for a change of the upper and/or lower half mold of the foaming tool.

Furthermore, coverings produced according to the inventive method are characterized by advantageous recycling properties since they are produced from a single reactive mix.

A preferred optional embodiment of the method according to the invention is characterized in that filler material, preferably barium sulfate and/or calcium carbonate, is added to the reactive mix formed from polyol and isocyanate before it is injected into the foaming tool. By adding filler material, the material cost of the covering can be substantially reduced. In this context, it is furthermore recommended to combine the filler material (barium sulfate and/or calcium carbonate) with carbon dioxide. Through this combination further cost optimization can be achieved.

It can be advantageous to provide the integral, substantially pore-free skin of the foamed molded component with a cover layer on the outside. Through the cover layer, the mechanical strength, the sound insulation effect, the sound absorption capability and/or the appearance of the foamed molded component can be improved. Another embodiment of the method according to the invention thus provides to insert a material web section or a blank of a plastic foil, in particular of a foam material foil, or of a fibrous fleece, in particular of a volume fleece, into the foaming tool, at the at least one surface portion, where the integral, substantially pore-free skin of the foamed molded component can be produced, and to inject it from behind with the reactive mix comprising polyol and isocyanate. This way, the injected molded component can be reliably and cost effectively connected to the cover layer.

With respect to the desired covering, the object mentioned above is accomplished according to the invention by a covering comprising the features of patent claim 11.

The covering according to the invention is substantially comprised of a sound absorbing molded part, foamed in a one-step process, made of open-cell soft polyurethane foam, which comprises an integral and substantially pore-free skin with a thickness of at least 0.5 mm on its one side, and which comprises an open-pore surface and/or thinner sound permeable skin on its side opposite to said skin. The substantially pore free skin has a sound insulating effect, while the remaining portion of the molded part has sound absorbing properties. The position, surface size and/or thickness of the substantially pore-free skin is dimensioned according to the acoustic properties and requirements. If required, the covering according to the invention can comprise several integral substantially pore-free skin portions, which are offset from one another.

Since the covering according to the invention is provided in particular as an inner dashboard covering, it can comprise one or plural openings for the arrangement or pass-through of units, like a pedal assembly, a steering column, cables and/or fluid conduits, when necessary. With respect to such a pass-through, it is provided according to a preferred embodiment of the covering according to the invention that an end of the pass-through is surrounded at a distance by the integral, substantially pore-free skin of the sound absorbing molded component, and that between said skin and the opening an open porous surface and/or a thinner sound permeable skin is formed. It has been found that an optimized sound absorption can be achieved hereby at the opening.

In another preferred embodiment of the covering according to the invention, it is provided that the substantially pore free skin forms a flexible lip seal at the rim of the covering. The flexible lip seal compensates for possible manufacturing tolerances and thus assures an optimum adaptation of the covering to adjacent components or body sections. Hereby, the sound insulating effect of the covering according to the invention is optimized.

Further preferred and advantageous embodiments of the covering according to the invention and of the method for its production are indicated in the dependent claims.

Figure 2:
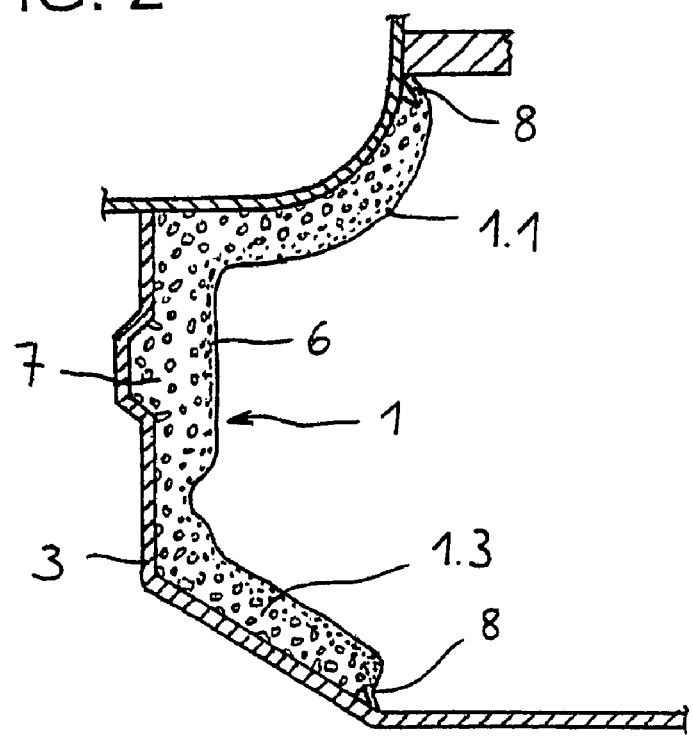
Figure 3:
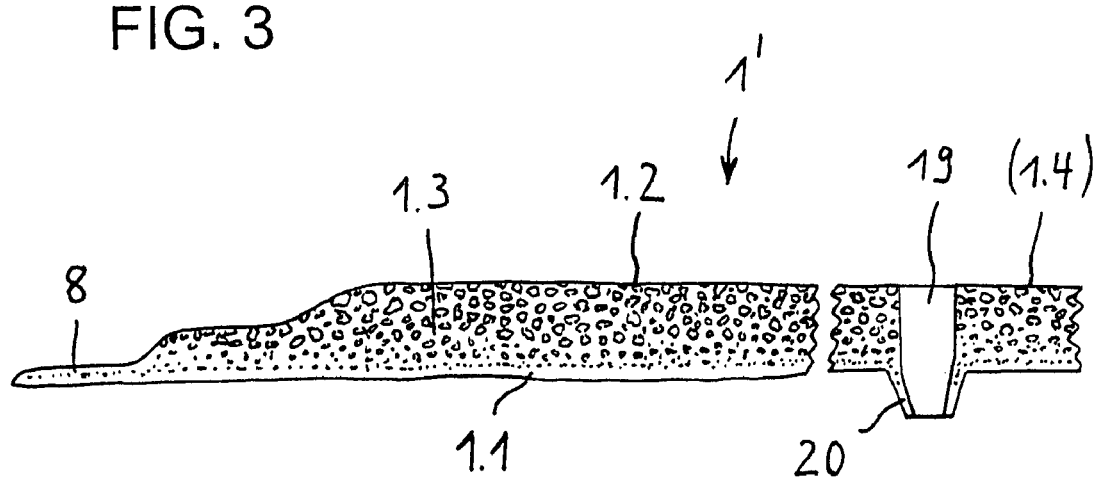
Figure 4:
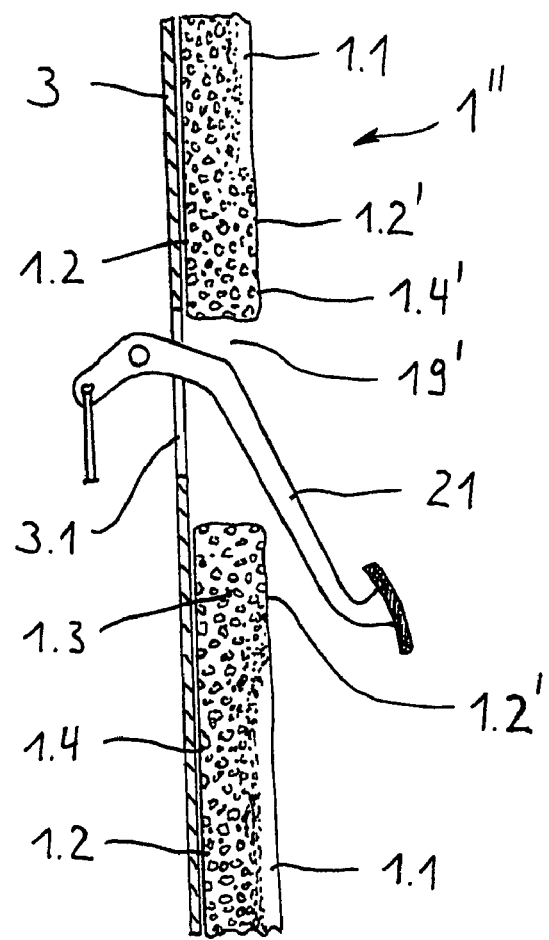
Figure 5:
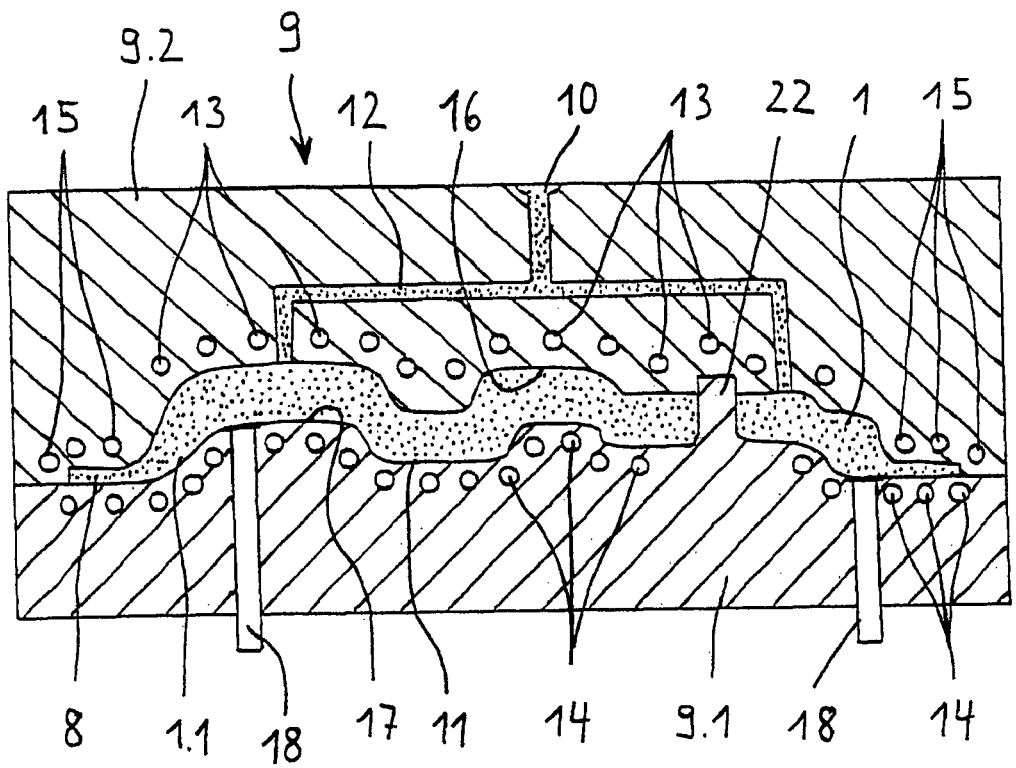
Figure 6:
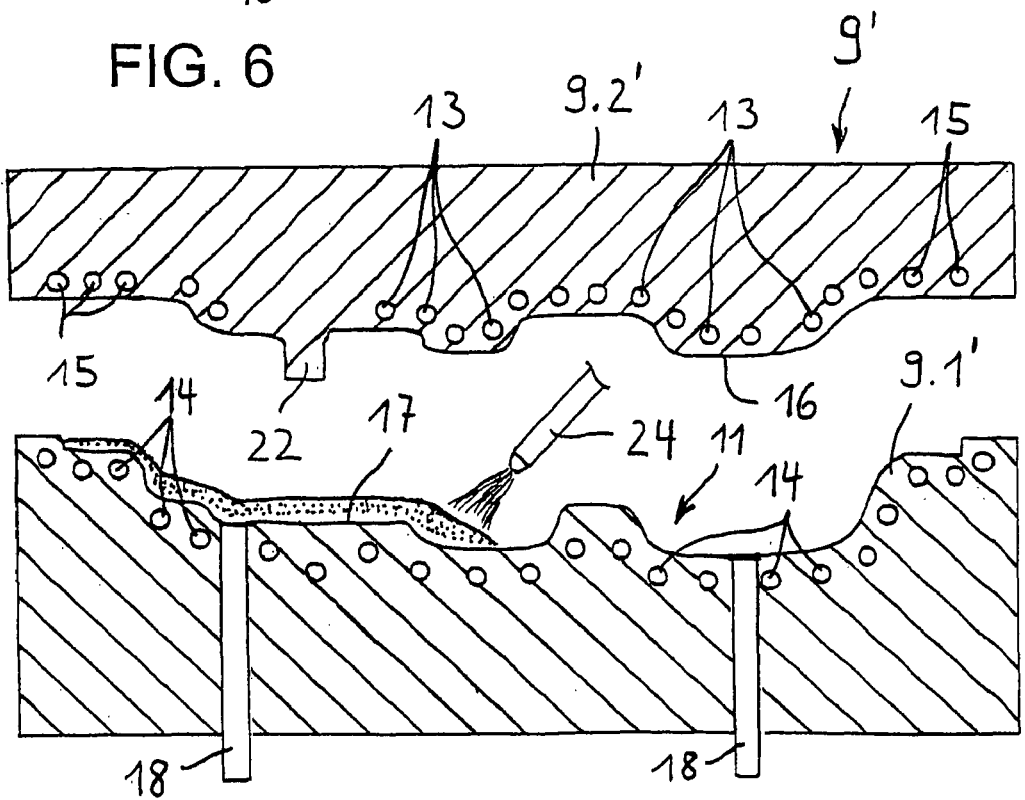
Figure 7:
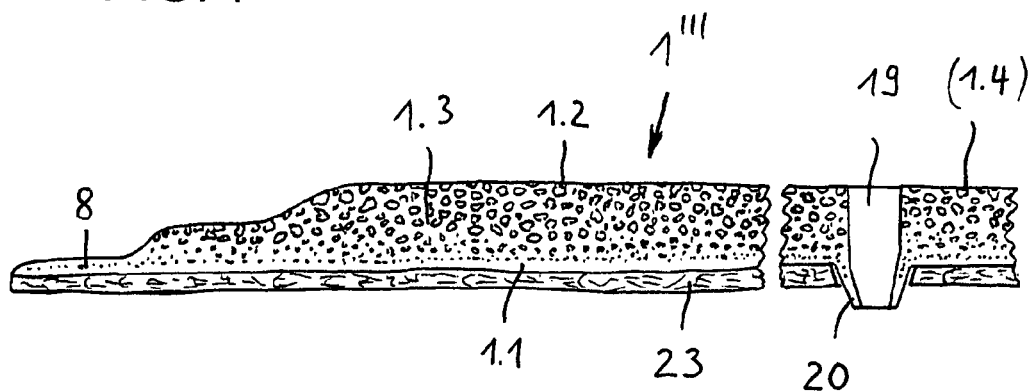
Figure 8:
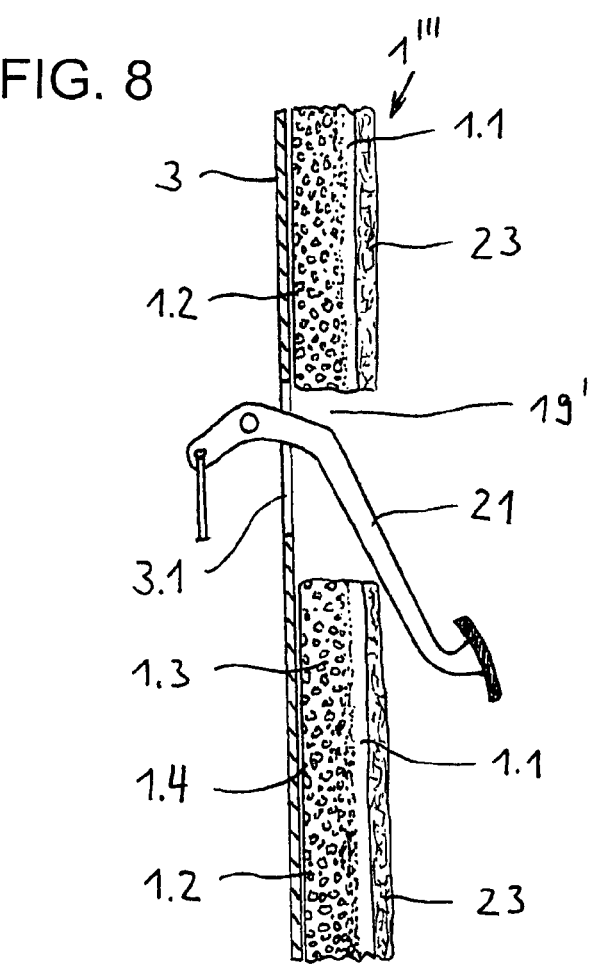

Subsequently, the invention is described in more detail with reference to a drawing depicting plural embodiments, schematically showing in:

FIG. 1 a sectional view of the front section of a motor vehicle with a dashboard covering disposed at the inside at the dashboard separating the passenger compartment from the engine compartment;

FIG. 2 a sectional view of a dashboard covering enlarged in comparison to FIG. 1;

FIG. 3 a sectional view of a section of a covering according to the invention according to a second embodiment;

FIG. 4 another sectional view of a section of a covering according to the invention;

FIG. 5 a sectional view of a foaming tool for producing a covering according to the invention;

FIG. 6 a sectional view of another foaming tool for producing a covering according to the invention;

FIG. 7 a sectional view of a section of a covering according to the invention according to another embodiment; and FIG. 8 a sectional view of a section of a covering according to the invention according to another embodiment.

The sound insulating covering according to the invention is preferably configured as an inner dashboard covering 1 for a motor vehicle 2. As a matter of principle, it can, however, also be configured as a sound insulating covering for other body components of a motor vehicle, e.g. as a sub-layer for a vehicle carpet.

As illustrated in FIGS. 1 and 2, the covering 1 is adapted to the contour of the dashboard 3, which separates the passenger compartment 4 from the engine compartment 5. The covering 1 is self-supporting and is characterized by a relatively low weight. Its total weight per unit area is preferably less than 900 g/m², for example less than 800 g/m². It is produced as a foamed molded component from a reactive soft foam mix, comprising polyol and isocyanate in a one-shot process, this means in a single-stage process step by means of a foaming tool.

In order to describe the manufacturing process, reference is made in particular to FIG. 5, in which a multi-component foaming tool 9 is schematically illustrated. Additional equipment elements, like e.g. storage tanks, containers with agitators, pumps, tubular conduits, a mixing head, etc., are not shown for reasons of clarity.

The major components (isocyanate and polyol) of the reactive mix are transferred from storage tanks into processing tanks, brought to the required temperature, and fed through dosage units to a mixing head, associated with a feed opening 10 of the foaming tool 9.

Filler material is preferably added to the reactive mix or to its main components. Optionally, however, the filler material can also be omitted. Barium sulfate and/or chalk are e.g. suitable as filler materials. The filler material ($BaSO_4$ and/or chalk) is preferably combined with $CO_2$. Through the addition of $CO_2$, the raw density of the foamed covering can be reduced.

The foaming tool 9 comprises a lower half mold 9.1 and an upper half mold 9.2, which define a cavity 11 in combination and in a closed state of the tool, wherein said cavity corresponds to the molded component to be produced. Injecting the reactive mix into the cavity 11 is performed through a feed- and distribution channel 12, configured in the upper half mold 9.2. The foaming tool 9 is provided with a tempering device, which comprises fluid channels 13, 14, 15, which are separately controllable and by which specific surface portions of the foaming tool 9, defining the cavity, can be tempered (cooled) in a controlled manner.

Tempering surface portions of the foaming tool in the present context means a relative cooling of the respective surface portions with respect to the warmer soft foam reactive mix.

The upper half mold 9.2 comprises a first group of fluid channels 13, which are connected to a common distribution manifold (not shown), which feeds a fluid, and which are connected to a common collector conduit (not shown), which drains the fluid. The temperature of said fluid, provided to said group of fluid channels 13, is regulated, so that the tool surface 16, disposed most proximal to said fluid channels 13, comprises a temperature in a range of 50° C. to 90° C., e.g. approximately 70°±15° C., or a temperature in said range is established there.

The fluid channels 14, integrated in the lower half mold 9.1, form a second group of fluid channels, which are connected to a common distributor manifold (not shown) feeding fluid, and which are connected to another collector manifold (not shown), draining said fluid, wherein the temperature of the fluid is controlled such that the tool surface 17 of the lower half mold 9.1, disposed most proximal to the second group of fluid channels 14, comprises a temperature in the range of 15° C. to 60° C., e.g. approximately 35° C.±15° C., or that a temperature in this range is established in said portion.

The temperature difference between the tool surfaces 16 and 17 is at least 15° C., preferably at least 25° C.

The foam structure of the one-layer molded component 1 is substantially produced by the propellant gases, produced during the chemical linking of the reactive mix. In the process the $CO_2$ combined with the filler material supports the foaming process.

Through the relative cooling of the tool surface 17 of the lower half mold 9.1, relative to the tool surface 16 of the upper half mold 9.2, the foaming process in the reactive mix is suppressed in a portion adjacent to the colder tool surface, so that an integral, substantially pore-free skin 1.1 with a thickness of at least 0.5 mm, preferably at least 0.8 mm, particularly preferably at least 1 mm, is produced there. The skin 1.1 acts as a sound insulating insulation layer. It is preferably airtight or at least substantially airtight.

At the warmer tool surface 16 of the upper half mold 9.2, however, a sound absorber with open pores is formed by the foaming process, wherein the sound absorber has an open porous surface 1.2, or only a very thin skin 1.4, wherein said skin, however, is sound permeable or sound transparent.

The sound permeable skin 1.4 has a thickness of less than 400 µm, preferably less than 250 µm. For example, it is thinner than 150 µm, and can also be only partially formed.

The one-piece covering 1 can optionally comprise a flexible seal lip 8 at the rim, which can compensate for possible manufacturing tolerances, and thus assures a tight adaptation of the covering 1 to the adjacent components or car body sections (re. FIGS. 2 and 3).

In order to configure the lip seal 8 substantially without pores, fluid channels 15 are provided in the upper half tool 9.2 close to the cavity section corresponding to the lip seal 8, which are also connected to the fluid manifold (not shown), associated with the second group of fluid channels 14. The fluid flowing through the fluid channels 14 and 15 thus has the same temperature.

In the lower half mold 9.1, furthermore pushrods 18 are integrated, by means of which the completed molded part, thus the covering 1, can be ejected from the foaming tool 9 after opening. Such ejection elements 18 can also be integrated in the upper half mold 9.2, or only in the upper half mold 9.2.

The open porous sound absorbing portion 1.3 of the one layer soft foam covering 1 comprises a raw density in the range of 0.02 to 0.06 g/cm$^3$. The raw density of the substantially pore free non-air permeable skin 1.1, on the other hand, is in the range of 0.08 to 2.0 g/cm$^3$, preferably in the range of 0.08 to 1.4 g/cm$^3$, in particular in the range of 0.1 to 1.1 g/cm$^3$.

In many sound insulating coverings for body components, openings have to be provided, e.g. for passing cables, hoses or mechanical units through. As illustrated in FIG. 3, at an opening 19 for a cable or for a hose conduit, preferably an elastically expandable grommet 20, for sealed pass-through of the cable or of the hose conduit (not shown) is formed on the side of the one layer covering 1', which comprises the skin, thus on the side, comprising the integral, substantially pore free skin 1.1.

In FIG. 4, a section of a dashboard 3 of a motor vehicle is shown in a schematic sectional view, wherein said dashboard comprises an opening 3.1 with a pedal assembly 21, reaching through said dashboard. At the inside of the dashboard 3, a covering 1" according to the invention is disposed, which comprises a pass-through 19' for the pedal assembly 21. The one layer dashboard covering 1" comprises the substantially pore-free skin 1.1 on its side, facing the passenger compartment. The skin 1.1 acting as an insulation layer surrounds the opening 19' at a distance. Between the air permeable skin 1.1 and the pass-through 19', a surface portion 1.2' with open pores is configured, which optimizes the sound absorbing effect of the covering 1" in the portion of the opening 19'. The open porous surface portion 1.2 surrounds the opening 19', e.g. in an annular manner.

As illustrated in FIG. 5, the foaming tool 9 can comprise at least one protrusion 22, disposed in the cavity 11, which generates an opening 19' in the respective molded component when injecting the reactive mix. It is furthermore illustrated in FIG. 5 that the fluid channels 14 in the lower half mold 9.1 are offset relatively far from the protrusion 22. The surface portion 17 of the foaming tool 9, at which the integral, substantially pore free skin 1.1 of the molded component can be created, surrounds the protrusion 22 accordingly at a certain distance. This way, as illustrated in FIG. 4, an open porous annular portion 1.2' remains about the opening 19' on the side of the covering 1", which comprises a substantially pore free skin.

FIG. 6 schematically illustrates another foaming tool 9' for producing a covering according to the invention. Different from the foaming tool according to FIG. 5, in this case, the soft foam reactive mix is injected or introduced into an open cavity of a foaming tool 9', comprised of a lower half mold 9.1' and an upper half mold 9.2'. Introducing the soft foam reactive mix is performed by means of an injection conduit 24, which is preferably operated by a robot (not shown). After introducing the soft foam reactive mix, the foaming tool 9' is closed for molding the sound insulating covering.

FIG. 7 illustrates another embodiment of a covering 1''' according to the invention. Different from the embodiment illustrated in FIG. 3, the integral substantially pore-free skin 1.1 is provided on the outside on the entire surface or only on a partial surface, and that in selected portions, with a cover layer 23. The cover layer 23 is effective acoustically. It can be comprised of a thin cover fleece material (fibrous fleece material), which provides a more esthetic appearance and/or a higher mechanical strength, in particular tear strength, to the covering 1'''. The cover fleece 23 e.g. comprises a weight per area in the range of 20 g/m$^2$ to 250 g/m$^2$.

Alternatively, the cover layer 23 can be comprised of a sound absorbent volume fleece, which comprises a weight per area in the range of 200 to 700 g/m$^2$, in particular 200 to 500 g/m$^2$, and a layer thickness in the range of 5 mm to 20 mm, in particular 5 mm to 10 mm.

The cover fleece or volume fleece is formed e.g. from polyester fibers, cotton or other natural or synthetic fibers.

Furthermore, the cover layer 23 can also be comprised of a plastic foil, in particular a foam material foil. The cover layer 23 can thus function in particular as a barrier layer.

In the embodiment illustrated in FIG. 8, the integral, substantially pore-free skin 1.1 of the foamed molded part is also provided with a cover layer 23.

The integral skin 1.1 is bonded to the cover layer 23. The bonded connection is established by inserting a material web section or a blank from a foil or from a fleece into a foaming tool according to FIG. 5 or 6, and that to the surface portion 17 of the foaming tool, at which the integral, substantially pore free skin 1.1 of the foamed molded part can be created. Thereafter, the foil or the fiber fleece is injected from behind with the reactive mix, including polyol and isocyanate, wherein the foaming tool 9, 9' is brought to different temperatures in different portions as described above.

Practicing the invention is not limited to the exemplary embodiments described above. Rather, various variations are conceivable, which use the inventive idea, defined in the patent claims in different embodiments. Thus, the covering 1, 1', 1" or 1''' according to the invention can also comprise plural partial sound insulation portions, this means plural integral, offset, substantially pore free, non air permeable skin portions 1.1, which are disposed on the covering 1, 1', 1" or 1''' according to the acoustic sound insulation requirements in an selected manner.

It shall be understood, that performing the method according to the invention is not limited to the described relative cooling of the lower half mold 9.1 relative to the upper half mold 9.2. Thus, it is included in the scope of the invention to cool the tool surface of the upper half mold, relative to the tool surface of the lower half mold, or to bring it to a respective temperature, in order to form an integral substantially pore free skin at the tool surface of the upper half mold. When required, the reactive mix can be injected into the tool cavity through a feed channel configured in the lower half mold.

The invention claimed is:

1. A method for producing a lightweight, sound insulating covering for a body component of a motor vehicle, in particular a lightweight dashboard covering, wherein the covering is produced as a foamed, sound absorbing molded part in a single-stage operation by injecting a reactive mix, comprising polyol and isocyanate, into a cavity of a foaming tool, wherein before or during the injecting, at least one predetermined surface portion, defining the cavity of the foaming tool, is temperature-controlled in such a manner that the foamed molded part comprises an integral substantially pore free skin with a thickness of at least 0.5 mm on one side, and comprises at least one of an open porous surface and a thinner sound permeable skin on its side opposite to said skin.

2. A method according to claim 1, wherein the at least one surface portion of the foaming tool, where the integral, substantially pore free skin of the foamed molded part can be produced, is cooled to a temperature in the range of 15° C. to 60° C.

3. A method according to claim 1, wherein the surface portion of the foaming tool, at which at least one of the open porous surface and the thinner sound permeable skin can be produced, is temperature controlled to a temperature in the range of 50° C. to 90° C.

4. A method according to claim 1, wherein the foaming tool is temperature-controlled in such a manner that between its surface portion, at which the integral substantially pore free skin of the foamed molded part can be produced, and its surface portion, at which at least one of the open porous surface and the thinner sound permeable skin can be produced, a temperature difference of at least 15° C. exists.

5. A method according to claim 1, wherein filler material is added to the reactive mix formed from polyol and isocyanate before injecting it into the foaming tool.

6. A method according to claim 5, wherein at least one of barium sulfate and calcium carbonate are added to the reactive mix as filler material.

7. A method according to claim 5, wherein carbon dioxide is added to the filler material.

8. A method according to claim 1, wherein the foaming tool comprises at least one protrusion disposed in the cavity, wherein said protrusion defines an opening in the molded part produced when the reactive mix is injected, wherein the at least one surface portion of the foaming tool, at which the integral, substantially pore free skin of the molded part can be produced, surrounds the protrusion at a distance.

9. A method according to claim 1, wherein the foaming tool comprises several cooled surface portions, offset from one another, so that the foamed molded part is produced with several integral skin portions, offset from one another, which are substantially pore free.

10. A method according to claim 1, wherein a material web section or a plastic foil blank, or a fibrous fleece blank, is inserted into the foaming tool at the at least one surface portion at which the integral substantially pore free skin of the foamed molded component can be produced, and injected from behind with the reactive mix, comprising polyol and isocyanate.

11. A lightweight, sound insulating covering for a body component of a motor vehicle, substantially comprised of a sound absorbing molded part, foamed in a one-step process, made of a soft open cell polyurethane foam, which comprises an integral substantially pore free skin with a thickness of at least 0.5 mm on one side, and which comprises at least one of an open porous surface and a thinner sound permeable skin on its side opposite to said skin.

12. A covering according to claim 11, comprising at least one opening, wherein an end of the opening is surrounded at a distance by the integral substantially pore free skin, and at least one of an open porous surface and a thinner sound permeable skin is configured between said skin and the opening.

13. A covering according to claim 11, comprising plural integral skin portions offset from one another and substantially pore free.

14. A covering according to claim 11, wherein the integral substantially pore free skin has a thickness of at least 1 mm.

15. A covering according to claim 11, whose total mass per unit area is less than 900 $g/m^2$.

16. A covering according to claim 11, wherein its open porous sound absorbing portion comprises a raw density in the range of 0.02 to 0.06 $g/cm^3$.

17. A covering according to claim 11, wherein its integral substantially pore free skin comprises a raw density in the range of 0.08 to 2.0 $g/cm^3$.

18. A covering according to claim 11, whose sound permeable skin comprises a thickness of less than 400 μm.

19. A covering according to claim 11, which is configured in one piece.

20. A covering according to claim 11, whose integral substantially pore free skin is provided partially or on its entire surface with a cover layer, comprising a plastic foil, or a fibrous fleece material, wherein the integral skin is bonded to the cover layer through injecting from behind.

21. A covering according to claim 20, wherein the fibrous fleece material has a weight per unit area of 20 to 150 $g/m^2$.

22. A covering according to claim 20, wherein the volume fleece material has at least one of a weight per unit area of 200 to 700 $g/m^2$ and a thickness of 5 to 20 mm.

* * * * *